(12) United States Patent
Gao et al.

(10) Patent No.: US 12,078,475 B2
(45) Date of Patent: Sep. 3, 2024

(54) THREE-DIMENSIONAL MEASUREMENT METHOD, DEVICE, AND STORAGE MEDIUM

(71) Applicant: GUANGDONG UNIVERSITY OF TECHNOLOGY, Guangzhou (CN)

(72) Inventors: Jian Gao, Guangzhou (CN); Yizhong Zhuang, Guangzhou (CN); Lanyu Zhang, Guangzhou (CN); Haixiang Deng, Guangzhou (CN); Yun Chen, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/423,054

(22) Filed: Jan. 25, 2024

(65) Prior Publication Data
US 2024/0159521 A1 May 16, 2024

Related U.S. Application Data

(63) Continuation of application No. PCT/CN2023/093885, filed on May 12, 2023.

(30) Foreign Application Priority Data

Jun. 9, 2022 (CN) .......................... 202210649253.6

(51) Int. Cl.
*G01B 11/25* (2006.01)
*G06T 7/73* (2017.01)
(Continued)

(52) U.S. Cl.
CPC ............ *G01B 11/2545* (2013.01); *G06T 7/75* (2017.01); *G06T 7/85* (2017.01); *G06T 17/00* (2013.01);
(Continued)

(58) Field of Classification Search
CPC ......... G01B 11/2545; G06T 7/75; G06T 7/85; G06T 17/00; G06T 2207/10012;
(Continued)

(56) References Cited

U.S. PATENT DOCUMENTS

| 2011/0080471 A1 | 4/2011 | Song et al. |
| 2012/0278036 A1 | 11/2012 | Da et al. |
| 2016/0255332 A1 | 9/2016 | Nash et al. |

FOREIGN PATENT DOCUMENTS

| CN | 102155924 A | 8/2011 |
| CN | 110375675 A | 10/2019 |

(Continued)

OTHER PUBLICATIONS

Internation Search Report of PCT/CN2023/093885, Mailed Jul. 20, 2023.

(Continued)

*Primary Examiner* — Ryan R Yang

(57) ABSTRACT

A three-dimensional measurement method combines the three-step phase shift method to embed the marker line information into the sinusoidal stripe pattern to obtain the target stripe pattern. The target stripe pattern is projected onto the surface of the object to be measured, and the wrapped phase image, mean intensity image and modulated intensity image of the stripe pattern collected by the left and right cameras are solved. The mask image according to the mean intensity image and modulation intensity image is solved to extract the marker line. The spatial phase unwrapping starting from the marker line in the wrapped phase image is performed to obtain the spatial phase. The spatial phase matching based on the unique correspondence between the left and right cameras based on the spatial phase of the marker line is performed, the best matching point of the right camera is obtained.

9 Claims, 2 Drawing Sheets

(51) Int. Cl.
   *G06T 7/80*     (2017.01)
   *G06T 17/00*    (2006.01)
   *H04N 13/239*   (2018.01)

(52) U.S. Cl.
   CPC . *H04N 13/239* (2018.05); *G06T 2207/10012* (2013.01); *G06T 2207/10028* (2013.01); *G06T 2207/30204* (2013.01); *G06T 2210/56* (2013.01)

(58) Field of Classification Search
   CPC . G06T 2207/10028; G06T 2207/30204; G06T 2210/56; H04N 13/239
   See application file for complete search history.

(56) References Cited

FOREIGN PATENT DOCUMENTS

| | | |
|---|---|---|
| CN | 111473744 A | 7/2020 |
| CN | 113063371 A | 7/2021 |
| CN | 113074667 A | 7/2021 |
| CN | 113506348 A | 10/2021 |
| CN | 114234850 A | 3/2022 |
| CN | 114234852 A | 3/2022 |

OTHER PUBLICATIONS

Qu, Xuejun et al., "3D Measurement Method Based on Binocular Vision Technique", Computer Simulation, vol. 28, No. 02, Feb. 28, 2011, ISSN:1006-9348 1-10, entire document.

THREE-DIMENSIONAL MEASUREMENT METHOD, DEVICE, AND STORAGE MEDIUM

CROSS-REFERENCE TO RELATED APPLICATIONS

This application is a continuation of International Patent Application No. PCT/CN2023/093885 with a filing date of May 12, 2023, designating the United States, now pending, and further claims priority to Chinese Patent Application No. 202210649253.6 with a filing date of Jun. 9, 2022. The content of the aforementioned applications, including any intervening amendments thereto, are incorporated herein by reference.

TECHNICAL FIELD

The present application relates to the technical field of three-dimensional measurement, and in particular, to a three-dimensional measurement method, device and storage medium.

BACKGROUND OF THE PRESENT INVENTION

Structured light measurement technology has the advantages of non-contact, full-field lossless measurement, high speed, and high precision. It has been widely used in industrial inspection, machine vision, cultural relic digitization, medicine and other fields. Among the existing multi-field structured light measurement systems, the multi-field structured light three-dimensional measurement system consisting of two cameras and a projector has the advantages of small number of projected patterns, fast absolute phase solution speed, and high point cloud reconstruction efficiency. It is widely used due to its advantages.

When performing three-dimensional measurements in the existing technology, the geometric constraint matching method is often used for phase matching to solve the absolute phase. The geometric constraint matching method uses the geometric relationship between the left and right cameras and projectors, combined with phase matching, to uniquely determine the three-dimensional point in the space. Although there is no need to project additional patterns and the solution speed is fast, the matching accuracy of this method is low due to reasons such as single feature information of a single pixel and unclear feature differences.

CONTENTS OF THE PRESENT INVENTION

This application provides a three-dimensional measurement method, device and storage medium to improve the existing technology of using geometric constraint matching method for phase matching, which has the technical problem of low matching accuracy, resulting in low three-dimensional reconstruction accuracy.

In view of this, the first aspect of this application provides a three-dimensional measurement method, which includes:

Combined with the three-step phase shift method, the marker line information is embedded into several sinusoidal stripe patterns to obtain several target stripe patterns;

Each target stripe pattern is projected onto the surface of the object to be measured through a projector, and collect the stripe pattern on the surface of the object to be measured through the left and right cameras;

The wrapped phase image, mean intensity image and modulated intensity image of the stripe pattern collected by the left and right cameras are solved;

The mask images corresponding to the left and right cameras based on the mean intensity images and modulated intensity images of the stripe patterns collected by the left and right cameras are solved. A global search on the mask images corresponding to the left and right cameras is performed through the minimum filter. The marker lines corresponding to the left and right cameras are extracted;

According to the extracted marker lines corresponding to the left and right cameras, spatial phase unwrapping starting from the marker lines in the wrapped phase images corresponding to the left and right cameras is performed, and the spatial phases of the left and right cameras based on the marker lines are obtained;

According to the unique correspondence between the spatial phase of the left and right cameras based on the marker line, a coarse matching of wrapped phases is performed based on geometric constraints to obtain the candidate points of the right camera, and a fine spatial phase matching of the candidate points of the right camera is performed to obtain the best matching point of the right camera;

According to the conversion relationship between the pixel coordinates of the right camera and the pixel coordinates of the projector, the abscissa value of the best matching point under the pixel coordinates of the projector is obtained, and the abscissa value of the best matching point under the pixel coordinates of the projector is used to calculate the absolute phase of the left camera;

Based on the absolute phase of the left camera, a three-dimensional point cloud is reconstructed according to the triangulation ranging, and a three-dimensional model of the object to be measured is obtained.

Optionally, the target stripe image is:

$$I_n(u,v) = \begin{cases} A + B\cos\left[\varphi(u,v) + \dfrac{2n\pi}{N}\right], & u \neq U \div 2 \\ m, & u = U \div 2 \end{cases};$$

In the formula, (u,v) is the pixel coordinate of the target stripe pattern, $I_n(u,v)$ is the nth target stripe image, N is the number of target stripe images, A is the mean intensity of the target stripe image, and B is the modulated intensity of the target stripe image, $\varphi(u,v)$ is the wrapped phase of the target stripe image, U is the maximum abscissa value of the target stripe image, and in is the marker line information.

Optionally, the mask images corresponding to the left and right cameras based on the mean intensity images and modulated intensity images of the stripe patterns collected by the left and right cameras are solved, which includes:

The ratio of the modulated intensity image and the mean intensity image of the stripe pattern collected by the left and right cameras is calculated at each pixel point, and the initial mask image corresponding to the left and right cameras is obtained;

The mask value, which is greater than the preset ratio threshold in the initial mask images corresponding to the left and right cameras, is set to 1, and the final mask image corresponding to the left and right cameras is obtained.

Optionally, the mask images corresponding to the left and right cameras are globally searched through a minimum value filter, and the marker lines corresponding to the left and right cameras are extracted, which includes:

The minimum value in the neighborhood of each pixel in the mask image corresponding to the left and right cameras is obtained through the minimum value filter;

The point corresponding to the minimum value of each row in the mask image corresponding to the left and right cameras is extracted through the minimum value in the neighborhood of each pixel point in the mask image corresponding to the left and right cameras, and a marker line is obtained.

Optionally, according to the extracted marker lines corresponding to the left and right cameras, a spatial phase unwrapping is performed starting from the marker lines in the wrapped phase images corresponding to the left and right cameras. The spatial phase of the left and right cameras based on the marker line is obtained, which includes:

According to the extracted marker lines corresponding to the left and right cameras, the spatial phase unwrapping starting from the marker lines in the wrapped phase images corresponding to the left and right cameras is performed through the spatial phase unwrapping formula, and the spatial phases of the left and right cameras based on the marker lines are obtained; the spatial phase unwrapping formula is:

$$\delta = \begin{cases} \varphi'(x, y) - \varphi'(x-1, y), & x \geq x' \\ \varphi'(x, y) - \varphi'(x+1, y), & x < x' \end{cases};$$

$$\phi(x, y) = \begin{cases} \varphi'(x, y), & fabs(\delta) < \pi \\ \varphi'(x, y) + \text{ceil}\left(\frac{fabs(\delta)}{2\pi}\right) * 2\pi, & \delta < -\pi \text{ and } x > x' \\ \varphi'(x, y) - 2\pi, & \delta > \pi \text{ and } x > x' \\ \varphi'(x, y) - \text{ceil}\left(\frac{fabs(\delta)}{2\pi}\right) * 2\pi, & \delta > \pi \text{ and } x < x' \\ \varphi'(x, y) + 2\pi, & \delta < \pi \text{ and } x < x' \end{cases}$$

In the formula, x' is the abscissa value of the marker line in the yth row, φ'(x, y) is the wrapped phase of the wrapped phase image corresponding to the left camera or the right camera at the pixel point (x, y), δ is the intermediate parameter, φ(x, y) is spatial phase of the left camera or the right camera based on the marker line at the pixel point (x, y), fabs(•) is the absolute value function, and cell(•) is the upward rounding function.

Optionally, according to the unique correspondence relationship between the spatial phases of the left and right cameras based on the marker line, coarse matching of wrapped phases is performed based on the geometric constraints to obtain the candidate point of the right camera, which includes:

According to the unique correspondence between the left and right cameras based on the spatial phase of the marker line, the wrapped phase difference value of each pixel corresponding to the wrapped phase image corresponding to the right camera and the wrapped phase image corresponding to the left camera is calculated;

The pixel points in the wrapped phase image of the right camera whose wrapped phase difference value is smaller than the first threshold or larger than the second threshold are used as candidate points of the right camera.

Optionally, the precise spatial phase matching on the candidate points of the right camera is performed to obtain the best matching point of the right camera, which includes:

The absolute difference between the spatial phase of each pixel in the candidate points of the right camera and the spatial phase of the corresponding pixel of the left camera is calculated;

The candidate point corresponding to the smallest absolute difference is regarded as the best matching point of the right camera.

Optionally, the absolute phase of the left camera is calculated through the abscissa value of the best matching point in the projector pixel coordinates, which includes:

The product of the abscissa value of the best matching point in the projector pixel coordinates and the stripe period number is calculated;

The ratio of the product to the number of pixels in a single stripe period is calculated, and the absolute phase of the left camera is obtained.

The second aspect of this application provides a three-dimensional measurement device, which includes a processor and a memory;

The memory is used to store program code and transmit the program code to the processor;

The processor is configured to execute any one of the three-dimensional measurement methods described in the first aspect according to instructions in the program code.

The third aspect provides a computer-readable storage medium, which is used to store program code. When the program code is executed by a processor, any one of the three-dimensional measurement methods described in the first aspect is implemented.

It can be seen from the above technical solutions that this application has the following advantages:

This application provides a three-dimensional measurement method that embeds the marker line information into the sinusoidal stripe pattern to obtain the target stripe pattern, and then projects it onto the surface of the object to be measured. The stripe pattern is collected through the left and right cameras and decoded to extract the marker lines for spatial phase solution. The unique correspondence between the spatial phases of the left and right cameras is used to perform rough matching of the wrapped phases based on geometric constraints to improve the accuracy of geometrically constrained phase solution. The extracted candidate points of the right camera are precisely matched in spatial phases to further ensure the matching accuracy, thereby improving the three-dimensional reconstruction accuracy. It improves the existing technology that uses geometric constraint matching method for phase matching, which has the technical problem of low matching accuracy, resulting in low three-dimensional reconstruction accuracy.

DESCRIPTION OF THE DRAWINGS

In order to explain the embodiments of the present application or the technical solutions in the prior art more clearly, the drawings needed to be used in the description of the embodiments or the prior art will be briefly introduced below. Obviously, the drawings in the following description are only some embodiments of the present application. For those of ordinary skill in the art, other drawings can be obtained based on these drawings without exerting any creative effort.

DETAILED DESCRIPTION OF PREFERRED EMBODIMENTS

In order to enable those in the technical field to better understand the solutions of the present application, the technical solutions in the embodiments of the present application will be clearly and completely described below in conjunction with the accompanying drawings in the embodiments of the present application. Obviously, the described embodiments are only part of the embodiments of this application, but not all of them. Based on the embodiments in this application, all other embodiments obtained by those of ordinary skill in the art without creative efforts fall within the scope of protection of this application.

In a typical dual-camera structured light three-dimensional measurement system, a projection device projects the stripe pattern onto the surface of the measured object during the measurement process. At the same time, the left and right cameras are used to collect the stripe pattern that is deformed by the height modulation of the measured object. Then the phase of the collected stripe images is solved, and the phase information of the left and right cameras is used to complete pixel matching. Finally, based on the phase information, matching results and calibrated system parameters, the triangular principle is used to obtain the three-dimensional information of the measured object.

The methods for solving the absolute phase of multi-field structured light based on phase matching can be divided into speckle matching method, dual-frequency fringe matching method and geometric constraint matching method. The speckle matching method can obtain higher spatial resolution and measurement accuracy, but requires the projection of additional speckle patterns; the dual-frequency fringe matching method projects fringe patterns of two frequencies, and converts high-frequency fringes through the dual-frequency heterodyne method to low-frequency fringes. Phase matching is performed combined with height constraints. But additional fringe patterns need to be projected; the geometric constraint matching method uses the geometric relationship between the left and right cameras and projectors, combined with phase matching to uniquely determine the three-dimensional point in the space. Although no additional pattern projection is required, due to reasons such as single pixel feature information and unclear feature differences, this method has low matching accuracy and is only suitable for low-frequency stripes. For solving the absolute phase of multi-field structured light, there are still problems such as the need to project additional stripe patterns and low matching accuracy. Therefore, in order to achieve high-speed and high-precision three-dimensional measurement, improving the phase matching accuracy and resolution speed without increasing the amplitude of the projection pattern has always been the focus of multi-field structured light research.

Figure 1:
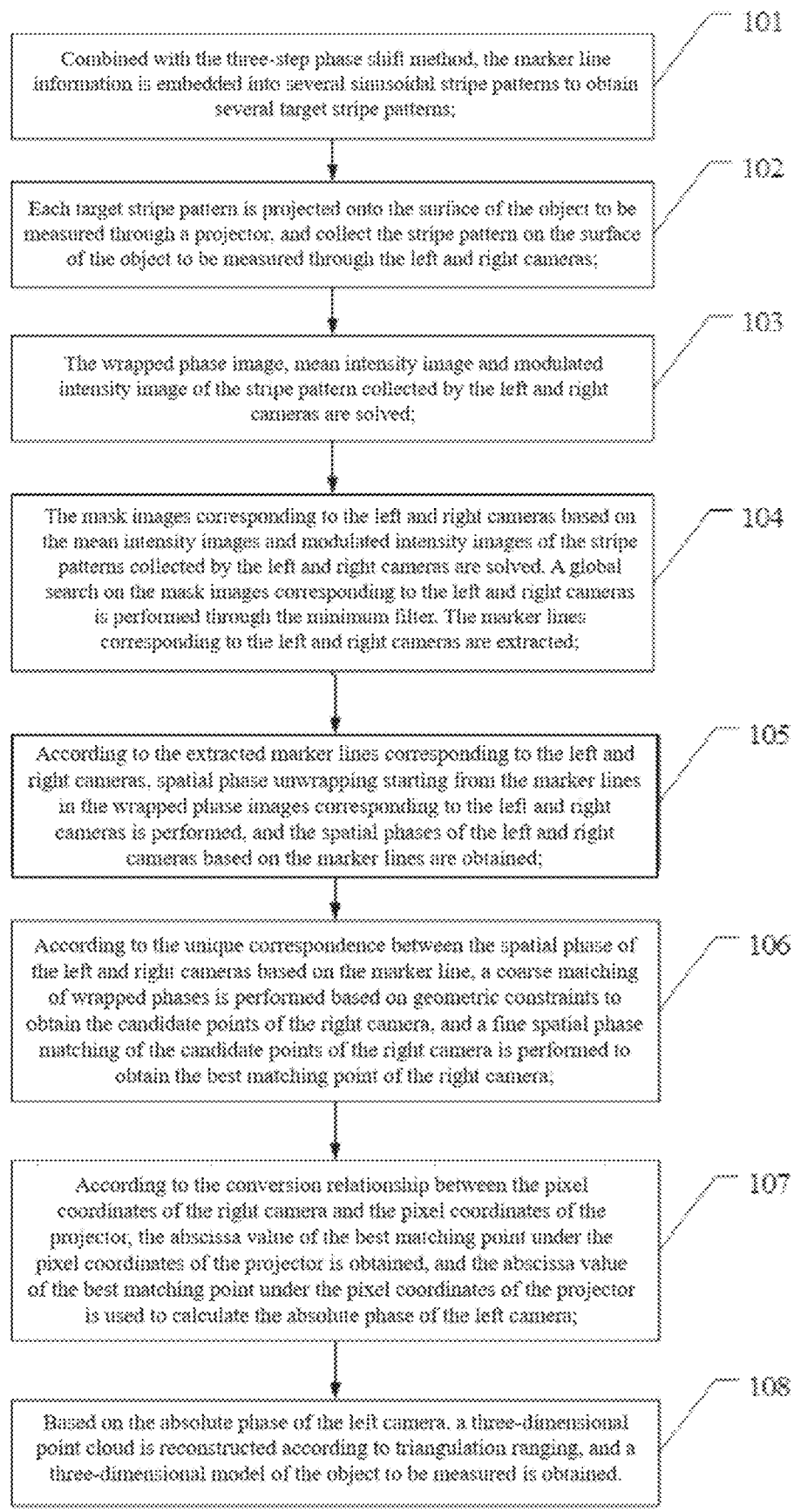
FIG. 1 is a schematic flow chart of the three-dimensional measurement method provided by an embodiment of the present application.

In order to improve the above problems, please refer to FIG. 1. The embodiment of the present application provides a three-dimensional measurement method, which includes:

Step 101: Combined with the three-step phase shift method, the marker line information is embedded into several sinusoidal stripe patterns to obtain several target stripe patterns;

According to the three-step phase shift method, the marker line information is embedded into several sinusoidal stripe patterns to obtain several target stripe patterns, namely:

$$I_n(u, v) = \begin{cases} A + B\cos\left[\varphi(u, v) + \frac{2n\pi}{N}\right], & u \neq U \div 2 \\ m, & u = U \div 2 \end{cases};$$

In the formula, (u,v) is the pixel coordinate of the target stripe pattern, $I_n(u,v)$ is the nth target stripe image, N is the number of target stripe images, A is the mean intensity of the target stripe image, and B is the modulated intensity of the target stripe image, $\varphi(u,v)$ is the wrapped phase of the target stripe image, U is the maximum abscissa value of the target stripe image, and in is the marker line information, m=255.

In the embodiment of this application, it is preferred to embed 3 sinusoidal stripe patterns to obtain 3 target stripe patterns, namely:

$$N = 3, n = 0, 1, 2, \varphi(u, v) = -\arctan\frac{\sqrt{3} \times [I_1(u, v) - I_2(u, v)]}{2I_0(u, v) - I_1(u, v) - I_2(u, v)}.$$

Step 102: Each target stripe pattern is projected onto the surface of the object to be measured through a projector, and collect the stripe pattern on the surface of the object to be measured through the left and right cameras;

The generated target stripe patterns are projected onto the surface of the object to be measured through a projector, and then the stripe patterns on the surface of the object to be measured are collected through the left and right cameras located on the left and right sides of the object to be measured. The left and right cameras include the left camera located on the left side of the object to be measured and the right camera located on the right of the object to be measured.

The stripe pattern collected by the left camera can be expressed as:

$$I_n^{left}(x, y) = \begin{cases} A_{left}(x, y) + B_{left}(x, y)\cos\left[\varphi_{left}(x, y) + \frac{2n\pi}{N}\right]; \\ m_n^{left} \end{cases}$$

The stripe pattern collected by the right camera can be expressed as:

$$I_n^{right}(x, y) = \begin{cases} A_{right}(x, y) + B_{right}(x, y)\cos\left[\varphi_{right}(x, y) + \frac{2n\pi}{N}\right]; \\ m_n^{right} \end{cases}$$

In the formula, (x, y) are the pixel coordinates of the stripe patterns collected by the left and right cameras, $I_n^{left}$ and $I_n^{right}$ are the nth stripe patterns collected by the left and right cameras respectively, $m_n^{left}$ and $m_n^{right}$ are the mark line information of the nth stripe pattern collected by the left and right cameras respectively. $A_{left}(x, y)$ and $A_{right}(x, y)$ are the mean intensity of the stripe pattern collected by the left camera and right camera respectively, $B_{left}(x, y)$ and $B_{right}(x, y)$ are the modulated intensity of the stripe patterns collected by the left camera and the right camera respectively, $\varphi_{left}(x, y)$ and $\varphi_{right}(x, y)$ are the wrapped phases of the stripe patterns collected by the left camera and the right camera respectively. It should be noted that the pixel coordinates of the collected image in the embodiment of the present application are based on the point in the upper left corner of the image as the origin.

Step 103: The wrapped phase image, mean intensity image and modulated intensity image of the stripe pattern collected by the left and right cameras are solved;

The wrapped phase image, mean intensity image and modulated intensity image of the strip pattern $I_n^{left}$ collected by the left camera, namely:

$$\varphi_{left}(x, y) = -\arctan\frac{\sqrt{3} \times [I_1^{left}(x, y) - I_2^{left}(x, y)]}{2I_0^{left}(x, y) - I_1^{left}(x, y) - I_2^{left}(x, y)};$$

$$A_{left}(x, y) = \frac{\sum_{n=0}^{2} I_n^{left}(x, y)}{3};$$

$$B_{left}(x, y) = \frac{2 \times \sqrt{\left[\sum_{n=0}^{2} I_n^{left}(x, y)\sin\left(\frac{2n\pi}{3}\right)\right]^2 + \left[\sum_{n=0}^{2} I_n^{left}(x, y)\cos\left(\frac{2n\pi}{3}\right)\right]^2}}{3};$$

By solving the above formula, the wrapped phase, mean intensity and modulated intensity at each pixel in the stripe pattern collected by the left camera are obtained, and the wrapped phase image, mean intensity image and modulated intensity image of the stripe pattern collected by the left camera are obtained.

According to the stripe pattern collected by the right camera, the wrapped phase image, mean intensity image and modulated intensity image of the stripe pattern collected by the right camera are solved, namely:

$$\varphi_{right}(x, y) = -\arctan\frac{\sqrt{3} \times [I_1^{right}(x, y) - I_2^{right}(x, y)]}{2I_0^{right}(x, y) - I_1^{right}(x, y) - I_2^{right}(x, y)};$$

$$A_{right}(x, y) = \frac{\sum_{n=0}^{2} I_n^{right}(x, y)}{3};$$

$$B_{right}(x, y) = \frac{2 \times \sqrt{\left[\sum_{n=0}^{2} I_n^{right}(x, y)\sin\left(\frac{2n\pi}{3}\right)\right]^2 + \left[\sum_{n=0}^{2} I_n^{right}(x, y)\cos\left(\frac{2n\pi}{3}\right)\right]^2}}{3};$$

By solving the above formula, the wrapped phase, mean intensity and modulated intensity at each pixel in the stripe pattern collected by the right camera are obtained, and the wrapped phase image, mean intensity image and modulated intensity image of the stripe pattern collected by the right camera are obtained.

Step 104: The mask images corresponding to the left and right cameras based on the mean intensity images and modulated intensity images of the stripe patterns collected by the left and right cameras are solved. A global search on the mask images corresponding to the left and right cameras is performed through the minimum filter. The marker lines corresponding to the left and right cameras are extracted;

The ratio of the modulated intensity image and the mean intensity image of the stripe pattern collected by the left and right cameras is calculated at each pixel point to obtain the initial mask images corresponding to the left and right cameras; the mask values, which are greater than the preset ratio threshold T in the initial mask images corresponding to the left and right cameras are set to 1 to obtain the final mask images corresponding to the left and right cameras. The mask images corresponding to the left and right cameras can be expressed as:

$$\text{mask}_{left}(x, y) = \begin{cases} 1, & \frac{B_{left}(x, y)}{A_{left}(x, y)} > T \\ \frac{B_{left}(x, y)}{A_{left}(x, y)}, & \text{Other} \end{cases}$$

-continued $$\text{mask}_{right}(x, y) = \begin{cases} 1, & \frac{B_{right}(x, y)}{A_{right}(x, y)} > T \\ \frac{B_{right}(x, y)}{A_{right}(x, y)}, & \text{Other} \end{cases}$$

In the formula, $\text{mask}_{left}(x, y)$ is the mask image corresponding to the left camera, and $\text{mask}_{right}(x, y)$ is the mask image corresponding to the right camera, where T can be set to a value greater than 0.8.

Figure 2:
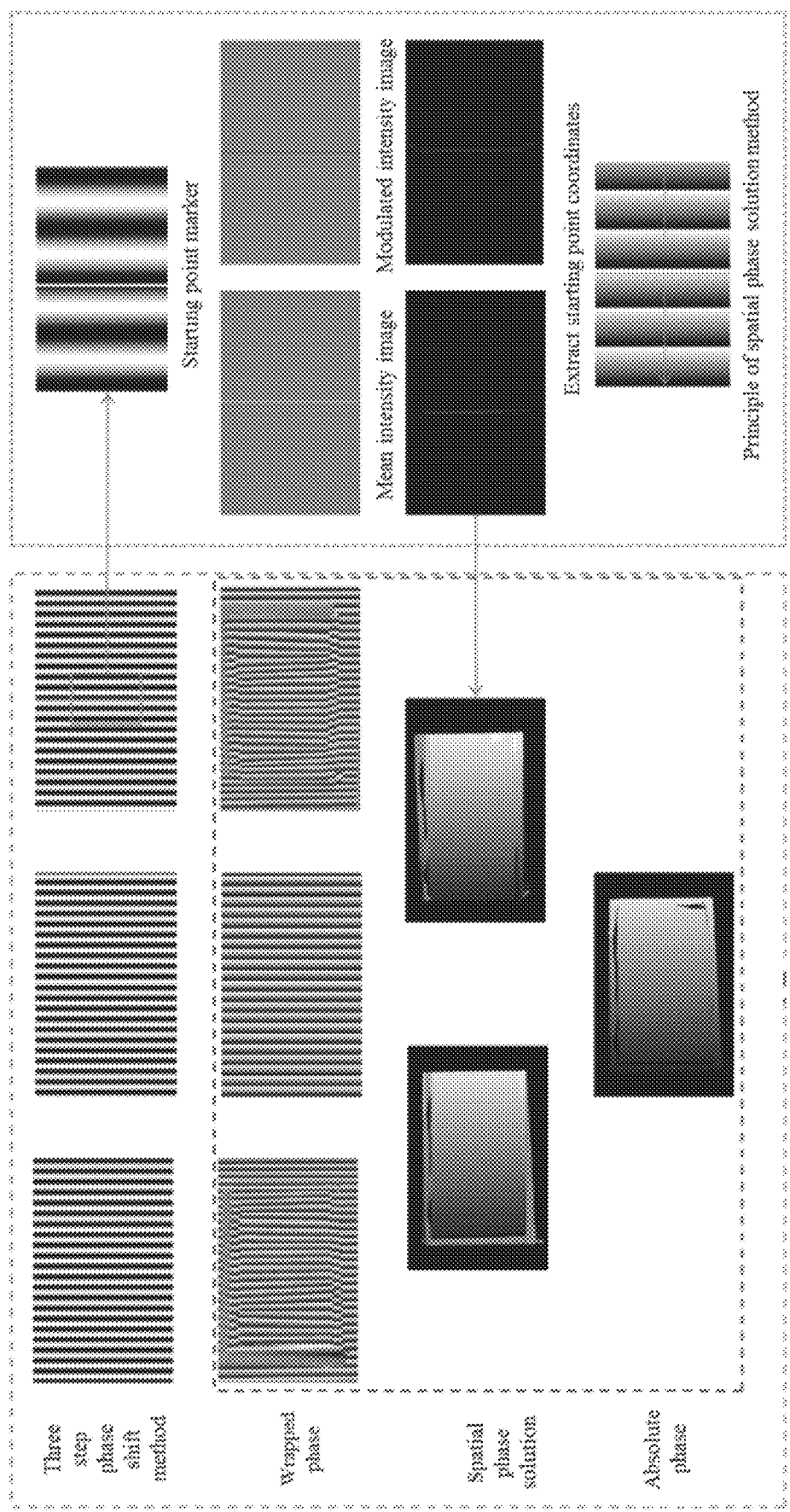
FIG. 2 is a visualization diagram of a process of solving the absolute phase provided by the embodiment of the present application.

You can refer to the mean intensity map and modulated intensity map in FIG. 2. The mean intensity of the marker line is coded as 255, and the modulated intensity of the marker line is coded as 0. Therefore, the minimum value in the neighborhood of each pixel in the mask image corresponding to the left and right cameras can be obtained through the minimum value filter; the point corresponding to the minimum value of each row in the mask image corresponding to the left and right cameras is extracted through the minimum value in the neighborhood of each pixel point in the mask image corresponding to the left and right cameras, and the marker line is obtained.

Specifically, when extracting the marker line corresponding to the left camera, the minimum value in the neighborhood of each pixel in the mask image corresponding to the left camera can be extracted first through the minimum value filter, namely:

$$fl_x = \text{Min Filter}(\text{mask}_{left}(x,y));$$

Then the point corresponding to the minimum value of each row in the mask image corresponding to the left camera is extracted through the minimum value in the neighborhood of each pixel in the mask image corresponding to the left camera, and the marker line $m_{min}^{left}$ is obtained, that is:

$$m_{min}^{left}(x',y) = \min(fl_0, fl_1, \ldots, fl_X);$$

In the formula, $fl_x$ is the result of the minimum value filtering of each row of pixels with abscissa x in the mask image corresponding to the left camera, MinFilter(•) is the minimum value filter, and X is the maximum value of the abscissa of the mask image, $m_{min}^{left}(x', y)$ is the minimum mask value of the yth row in the mask image corresponding to the left camera, x' is the abscissa value of the corresponding minimum mask value of the yth row, that is, the abscissa value of the marker line in the yth row, min(•) is the minimum value function.

When extracting the marker line corresponding to the right camera, the minimum value in the neighborhood of each pixel in the mask image corresponding to the right camera can be extracted first through the minimum value filter, namely:

$$fr_x = \text{Min Filter}(\text{mask}_{right}(x,y));$$

Then the point corresponding to the minimum value of each row in the mask image corresponding to the right camera is extracted through the minimum value in the neighborhood of each pixel in the mask image corresponding to the right camera, and the marker line $m_{min}^{right}$ is obtained, namely:

$$m_{min}^{right}(x',y) = \min(fr_0, fr_1, \ldots, fr_X);$$

In the formula, $fr_x$ is the result of the minimum value filtering of each row of pixels with abscissa x in the mask image corresponding to the right camera, and $m_{min}^{right}(x', y)$ is the minimum mask value of the yth row in the mask image corresponding to the right camera, x' is the abscissa value of the corresponding minimum mask value in row y.

Step 105: According to the extracted marker lines corresponding to the left and right cameras, spatial phase unwrapping starting from the marker lines in the wrapped phase images corresponding to the left and right cameras is performed, and the spatial phases of the left and right cameras based on the marker lines are obtained;

According to the extracted marker lines corresponding to the left and right cameras, spatial phase unwrapping is performed starting from the marker lines in the wrapped phase images corresponding to the left and right cameras through the spatial phase unwrapping formula, and the spatial phases of the left and right cameras based on the marker lines are obtained; the spatial phase unwrapping formula is:

$$\delta = \begin{cases} \varphi'(x, y) - \varphi'(x-1, y), & x \geq x' \\ \varphi'(x, y) - \varphi'(x+1, y), & x < x' \end{cases};$$

$$\phi(x, y) = \begin{cases} \varphi'(x, y), & fabs(\delta) < \pi \\ \varphi'(x, y) + \text{ceil}\left(\frac{fabs(\delta)}{2\pi}\right) * 2\pi, & \delta < -\pi \text{ and } x > x' \\ \varphi'(x, y) - 2\pi, & \delta > \pi \text{ and } x > x' \\ \varphi'(x, y) - \text{ceil}\left(\frac{fabs(\delta)}{2\pi}\right) * 2\pi, & \delta > \pi \text{ and } x < x' \\ \varphi'(x, y) + 2\pi, & \delta < \pi \text{ and } x < x' \end{cases}$$

In the formula, x' is the abscissa of the marker line in the yth column, $\varphi'(x, y)$ is the wrapped phase of the wrapped phase image corresponding to the left camera or the right camera at the pixel point (x, y), $\delta$ the intermediate parameter, $\phi(x, y)$ is the spatial phase of the left camera or the right camera based on the marker line at the pixel point (x, y), fabs(•) is the absolute value function, and cell(•) is the upward rounding function. When calculating the spatial phase of the left camera, $\varphi'(x, y) = \varphi_{left}(x, y)$, when calculating the spatial phase of the right camera, $\varphi'(x, y) = \varphi_{right}(x, y)$.

Step 106: According to the unique correspondence between the spatial phase of the left and right cameras based on the marker line, a coarse matching of wrapped phases is performed based on geometric constraints to obtain the candidate points of the right camera, and a fine spatial phase matching of the candidate points of the right camera is performed to obtain the best matching point of the right camera;

Since the marker line information is embedded in the target stripe pattern projected by the projector, the left and right cameras respectively collect stripe images and solve the wrapped phase. The acquired marker line information has the same physical meaning, that is, they all correspond to the mark line information of the target stripe pattern embedded in the projection; since the physical meaning of the marker line is the same, that is, the starting point of the spatial phase solution is the same. The spatial phases of the left and right cameras based on the marker line have a unique correspondence. This unique correspondence refers to that, based on the spatial phase of the marker line, a certain pixel point of the left camera can find a unique matching point in the right camera, because the spatial phases of the two points are the same. Therefore, the wrapped phase difference of each pixel corresponding to the wrapped phase image corresponding to the right camera and the wrapped phase image corresponding to the left camera can be calculated based on the unique correspondence between the spatial phases of the marker line of the left and right cameras; the pixels in the wrapped phase image of the right camera whose wrapped phase difference value is smaller than the first threshold R or larger than the second threshold $2\pi$-R are used as candidate points of the right camera, namely:

$$\varphi_{right}(x_i,y_i) \in [(fabs(\varphi_{right}(x_i,y_i) - \varphi_{left}(x,y)) < R) \text{ or } (fabs(\varphi_{right}(x_i,y_i) - \varphi_{left}(x,y)) > 2\pi - R)];$$

In the formula, $\varphi_{right}(x_i, y_i)$ is the wrapped phase of the candidate point of the right camera after the wrapped phase coarse matching, $(x_i, y_i)$ is the ith candidate point of the right camera, and $\varphi_{left}(x, y)$ is the wrapped phase of the pixel point (x, y) of the left camera corresponding to the candidate point $(x_i, y_i)$ of the right camera, R generally takes a value between 0.2 $\pi$–0.4 $\pi$.

Geometric constrained phase matching is an existing common binocular structured light matching algorithm. Its principle is that after obtaining the wrapped phase images of the left camera and the right camera, geometric constraints is used to find the multiple corresponding points of the pixels of the left camera wrapped phase image in the right camera wrapped phase image. The wrapped phase difference values between the pixels of the left camera and the multiple corresponding points of the right camera are calculated. And the pixels in the wrapped phase image of the right camera whose wrapped phase difference value is smaller than the first threshold or larger than the second threshold are used as candidate points of the right camera. This process is a rough matching.

The absolute difference between the spatial phase of each pixel in the candidate point of the right camera and the spatial phase of the corresponding pixel of the left camera is calculated; the candidate point corresponding to the smallest absolute difference is used as the best matching point of the right camera, namely:

$$diff_i = fabs(\phi_{right}(x_i,y_i) - \phi_{left}(x,y));$$

$$\phi_{right}^{best}(x_{best}, y_{best}) = \min(diff_0, diff_1, \ldots, diff_i),$$

In the formula, $\phi_{right}(x_i, y_i)$ is the spatial phase of the candidate point $(x_i, y_i)$ of the right camera, $\phi_{left}(x, y)$ is the spatial phase of the pixel point (x, y) of the left camera, $diff_i$ is the absolute difference between the spatial phase of the ith candidate point of the right camera and the spatial phase of the corresponding pixel of the left camera, $\phi_{right}^{best}(x_{best}, y_{best})$ is the smallest absolute difference in spatial phase, and $(x_{best}, y_{best})$ is the best matching point.

Step 107: According to the conversion relationship between the pixel coordinates of the right camera and the pixel coordinates of the projector, the abscissa value of the best matching point under the pixel coordinates of the projector is obtained, and the abscissa value of the best matching point under the pixel coordinates of the projector is used to calculate the absolute phase of the left camera.

According to the conversion relationship between the pixel coordinates of the right camera and the pixel coordinates of the projector, the pixel coordinates of the best matching point of the right camera is converted to the pixel coordinates of pixel coordinates of the projector, and the abscissa coordinate $x_p$ of the best matching point of the pixel coordinates of the projector is obtained. The conversion relationship between the pixel coordinates of the right camera and the pixel coordinates of the projector is determined by the calibration parameters. The specific calibration process belongs to the existing technology and will not be described in detail here.

The product of the abscissa value $2\pi * x_p$ of the best matching point in the pixel coordinates of the projector and the number 2π of stripe periods is calculated; the ratio of the product to the number of pixels f in a single stripe period is calculated to obtain the absolute phase of the left camera φ, that is:

$$\phi = \frac{2\pi * x_p}{f}$$

Step 108: Based on the absolute phase of the left camera, a three-dimensional point cloud is reconstructed according to triangulation ranging, and a three-dimensional model of the object to be measured is obtained.

Based on the absolute phase of the left camera and the calibration parameters, the three-dimensional point cloud is reconstructed according to the triangular ranging, and a three-dimensional model of the object to be measured is obtained. The specific process of the three-dimensional reconstruction belongs to the existing technology and will not be described again here.

In the embodiment of this application, the marker line information is embedded into the sinusoidal stripe pattern to obtain the target stripe pattern, and then projected onto the surface of the object to be measured. The stripe pattern is collected through the left and right cameras and decoded to extract the marker lines for spatial phase solution. The unique correspondence between the spatial phases of the left and right cameras is used to perform coarse matching of wrapped phases based on geometric constraints to improve the accuracy of the geometric constraint phase resolution, and precise spatial phase matching is performed on the extracted candidate points of the right camera to further ensure the matching accuracy, thereby improving the three-dimensional reconstruction accuracy. It improves the existing technology that uses geometric constraint matching method for phase matching, which has the technical problem of low matching accuracy, resulting in low three-dimensional reconstruction accuracy.

Compared with the conventional speckle matching and dual-frequency fringe matching, the three-dimensional measurement method in the embodiment of the present application does not need to project additional stripe patterns, reduce projection time and phase solution data, and improve the matching speed; compared with the conventional geometric constraint matching method, it can improve the matching accuracy and reduce matching errors caused by single feature information and unclear feature differences.

The application also provides a three-dimensional measuring device, which includes a processor and a memory;

The memory is used to store program code and transmit the program code to the processor;

The processor is configured to execute the three-dimensional measurement method in the foregoing method embodiment according to instructions in the program code.

The application also provides a computer-readable storage medium, which is used to store program code. And when the program code is executed by a processor, the three-dimensional measurement method in the foregoing method embodiment is implemented.

The terms "first", "second", "third", "fourth", etc. (if present) in the description of this application and the above-mentioned drawings are used to distinguish similar objects and are not necessarily used to describe specific sequence. It is to be understood that the data so used are interchangeable under appropriate circumstances so that the embodiments of the application described herein can, for example, be practiced in sequences other than those illustrated or described herein. In addition, the terms "include" and "have" and any variations thereof are intended to cover non-exclusive inclusions, e.g., a process, method, system, product, or apparatus that encompasses a series of steps or units and need not be limited to those explicitly listed. Those steps or elements may instead include other steps or elements not expressly listed or inherent to the process, method, product or apparatus.

It should be understood that in this application, "at least one (item)" refers to one or more, and "multiple" refers to two or more. "And/or" is used to describe the relationship between associated objects, indicating that there can be three relationships. For example, "A and/or B" can mean: only A exists, only B exists, and A and B exist simultaneously. Where A and B can be singular or plural. The character "/" generally indicates that the related objects are in an "or" relationship. "At least one of the following" or similar expressions thereof refers to any combination of these items, including any combination of a single item (items) or a plurality of items (items). For example, at least one item (item) of a, b or c can mean: a, b, c, "a and b", "a and c", "b and c", or "a and b and c"", where a, b, c can be single or multiple.

The technical solution of the present application is essentially or contributes to the existing technology, or all or part of the technical solution can be embodied in the form of a software product. The computer software product is stored in a storage medium and includes a number of instructions. All or part of the steps of the methods described in various embodiments of this application can be executed through a computer device (which may be a personal computer, a server, or a network device, etc.). The aforementioned storage media includes U disk, mobile hard disk, read-only memory (ROM), random access memory (RAM), various media such as magnetic discs or optical discs that can store program code.

As mentioned above, the above embodiments are only used to illustrate the technical solution of the present application, but not to limit it. Although the present application has been described in detail with reference to the foregoing embodiments, those of ordinary skill in the art should understand that they can still modify the technical solutions recorded in the foregoing embodiments, or make equivalent substitutions for some of the technical features; and these modifications or substitutions do not cause the essence of the corresponding technical solution to deviate from the spirit and scope of the technical solution of each embodiment of the present application.

What is claimed is:

1. A three-dimensional measurement method, wherein, the three-dimensional measurement method comprising the following steps of:

combining with a three-step phase shift method, marker line information is embedded into several sinusoidal stripe patterns to obtain several target stripe patterns;

projecting each of the target stripe patterns onto a surface of an object to be measured through a projector, and collecting stripe patterns on the surface of the object to be measured through left and right cameras;

calculating wrapped phase images, mean intensity images and modulated intensity images of the stripe patterns collected by the left and right cameras;

calculating mask images corresponding to the left and right cameras based on the mean intensity images and modulated intensity images of the stripe patterns collected by the left and right cameras, and performing a global search on the mask images corresponding to the left and right cameras through a minimum valve filter, to extract marker lines corresponding to the left and right cameras;

according to the marker lines corresponding to the left and right cameras, adopting the marker lines as starting lines and performing a spatial phase unwrapping on the wrapped phase images corresponding to the left and right cameras to obtain the spatial phase of the left and right cameras based on the marker lines;

according to an unique correspondence between the spatial phase of the left and right cameras based on the marker lines, performing a coarse matching of wrapped phases based on geometric constraints to obtain candidate points of a right camera, and performing a fine spatial phase matching on the candidate points of the right camera to obtain a matching point of the right camera;

according to a conversion relationship between pixel coordinates of the right camera and pixel coordinates of the projector, obtaining an abscissa value of the matching point under the pixel coordinates of the projector, and calculating an absolute phase of the left camera based on the abscissa value of the matching point under the pixel coordinates of the projector;

based on the absolute phase of the left camera, reconstructing a three-dimensional point cloud according to a triangulation ranging technology, and a three-dimensional model of the object to be measured is obtained.

2. The three-dimensional measurement method according to claim 1, wherein, describing the target stripe patterns as:

$$I_n(u,v) = \begin{cases} A + B\cos\left[\varphi(u,v) + \dfrac{2n\pi}{N}\right], & u \neq U \div 2 \\ m, & u = U \div 2 \end{cases};$$

where, (u,v) is the pixel coordinate of the target stripe patterns, $I_n(u,v)$ is a nth target stripe patterns, N is a number of target stripe patterns, A is a mean intensity of the target stripe patterns, and B is a modulated intensity of the target stripe patterns, φ(u,v) are the wrapped phases of the target stripe patterns, U is a maximum abscissa value of the target stripe patterns, and m is the marker line information.

3. The three-dimensional measurement method according to claim 1, wherein, the step of calculating wrapped phase images, mean intensity images and modulated intensity images of the stripe patterns collected by the left and right cameras, comprises:

calculating a ratio at each pixel point of the modulated intensity images and the mean intensity images of the stripe patterns collected by the left and right cameras, and to obtain initial mask images corresponding to the left and right cameras;

Setting a mask value of the initial mask images corresponding to the left and right cameras to 1, if the ratio is greater than a preset ratio threshold, and to obtain the final mask images corresponding to the left and right cameras.

4. The three-dimensional measurement method according to claim 1, wherein, the step of performing a global search on the mask images corresponding to the left and right cameras through a minimum value filter, to extract marker lines corresponding to the left and right cameras comprises:

obtaining a minimum value in a neighborhood of each pixel in the mask images corresponding to the left and right cameras through the minimum value filter;

extracting a point corresponding to the minimum value of each row in the mask image corresponding to the left and right cameras through the minimum value in the neighborhood of each pixel point in the mask images corresponding to the left and right cameras, and to obtain a marker line.

5. The three-dimensional measurement method according to claim 1, wherein, the step of according to the marker lines corresponding to the left and right cameras, adopting the marker lines as starting lines and performing a spatial phase unwrapping on the wrapped phase images corresponding to the left and right cameras, to obtain the spatial phase of the left and right cameras based on the marker lines comprises:

according to the marker lines corresponding to the left and right cameras, adopting the marker lines as starting lines and performing the spatial phase unwrapping on the wrapped phase images corresponding to the left and right cameras through a spatial phase unwrapping formula, to obtain the spatial phase of the left and right cameras based on the marker lines; the spatial phase unwrapping formula is:

$$\delta = \begin{cases} \varphi'(x,y) - \varphi'(x-1,y), & x \geq x' \\ \varphi'(x,y) - \varphi'(x+1,y), & x < x' \end{cases};$$

$$\phi(x,y) = \begin{cases} \varphi'(x,y), & fabs(\delta) < \pi \\ \varphi'(x,y) + \text{ceil}\left(\dfrac{fabs(\delta)}{2\pi}\right)*2\pi, & \delta < -\pi \text{ and } x > x' \\ \varphi'(x,y) - 2\pi, & \delta > \pi \text{ and } x > x' \\ \varphi'(x,y) - \text{ceil}\left(\dfrac{fabs(\delta)}{2\pi}\right)*2\pi, & \delta > \pi \text{ and } x < x' \\ \varphi'(x,y) + 2\pi, & \delta < \pi \text{ and } x < x' \end{cases};$$

where, x' is a abscissa value of the marker lines in the yth row, φ'(x, y) is the wrapped phase of the wrapped phase image corresponding to the left camera or the right camera at the pixel point (x, y), δ is the intermediate parameter, φ(x, y) is the spatial phase of the left camera or the right camera based on the marker lines at a pixel point (x, y), fabs( ) is a absolute value function, and ceil( ) is an upward rounding function.

6. The three-dimensional measurement method according to claim 1, wherein, the step of according to an unique correspondence between the spatial phase of the left and right cameras based on the marker lines, performing a coarse matching of wrapped phases based on geometric constraints to obtain candidate points of a right camera comprises:

according to the unique correspondence between the left and right cameras based on the spatial phase of the marker lines, calculating a wrapped phase difference value of each pixel corresponding to the wrapped phase images corresponding to the right camera and the wrapped phase image corresponding to the left camera;

determining the pixel points in the wrapped phase images as candidate points of the right camera if the wrapped phase difference value is smaller than a first threshold or larger than a second threshold.

7. The three-dimensional measurement method according to claim 1, wherein, the step of performing a fine spatial phase matching on the candidate points of the right camera to obtain a matching point of the right camera comprises:

calculating an absolute difference between the spatial phase of each pixel in the candidate points of the right camera and the spatial phase of the corresponding pixel of the left camera;

regarding the candidate point corresponding to a smallest absolute difference as the matching point of the right camera.

8. The three-dimensional measurement method according to claim 1, wherein, the step of calculating an absolute phase of the left camera based on the abscissa value of the matching point under the pixel coordinates of the projector:
calculating a product of the abscissa value of the matching point in the projector pixel coordinates and the stripe period number;
calculating a ratio of the product to the number of pixels in a single stripe period-, to obtain the absolute phase of the left camera.

9. A three-dimensional measuring device, wherein the device comprises a processor and a memory;
the memory is configured to store a program code and transmit the program code to the processor;
the processor is configured to execute a three-dimensional measurement method according to instructions in the program code;
the three-dimensional measurement method comprises:
combining with a three-step phase shift method, marker line information is embedded into several sinusoidal stripe patterns to obtain several target stripe patterns;
projecting each of the target stripe patterns onto a surface of an object to be measured through a projector, and collecting stripe patterns on the surface of the object to be measured through left and right cameras;
calculating wrapped phase images, mean intensity images and modulated intensity images of the stripe patterns collected by the left and right cameras;
calculating mask images corresponding to the left and right cameras based on the mean intensity images and modulated intensity images of the stripe patterns collected by the left and right cameras, and performing a global search on the mask images corresponding to the left and right cameras through a minimum valve filter, to extract marker lines corresponding to the left and right cameras;
according to the marker lines corresponding to the left and right cameras, adopting the marker lines as starting lines and performing a spatial phase unwrapping on the wrapped phase images corresponding to the left and right cameras, to obtain the spatial phase of the left and right cameras based on the marker lines;
according to an unique correspondence between the spatial phase of the left and right cameras based on the marker lines, performing a coarse matching of wrapped phases based on geometric constraints to obtain candidate points of a right camera, and performing a fine spatial phase matching on the candidate points of the right camera to obtain a matching point of the right camera;
according to a conversion relationship between pixel coordinates of the right camera and pixel coordinates of the projector, obtaining an abscissa value of the matching point under the pixel coordinates of the projector, and calculating an absolute phase of the left camera based on the abscissa value of the matching point under the pixel coordinates of the projector;
based on the absolute phase of the left camera, reconstructing a three-dimensional point cloud according to a triangulation ranging technology, and a three-dimensional model of the object to be measured is obtained.

* * * * *